April 29, 1952  R. J. HERST ET AL  2,594,775
ELECTROMAGNETIC CLUTCH AND BRAKE SERVO MECHANISM
Filed Aug. 30, 1949  3 Sheets-Sheet 1
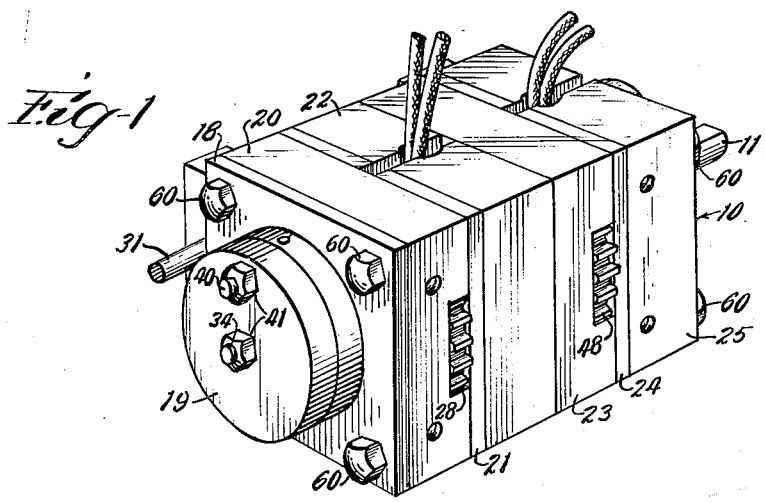
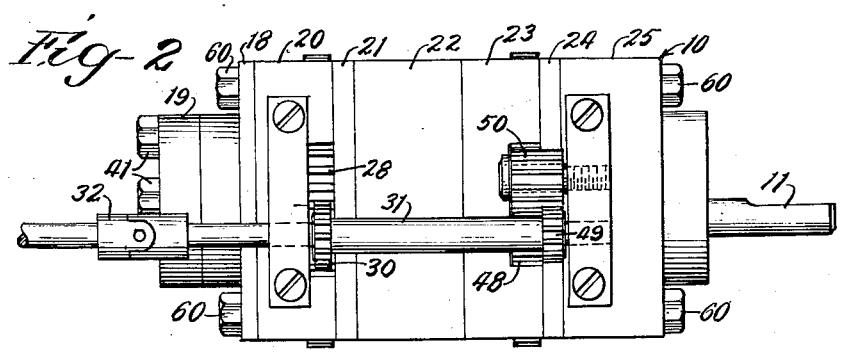
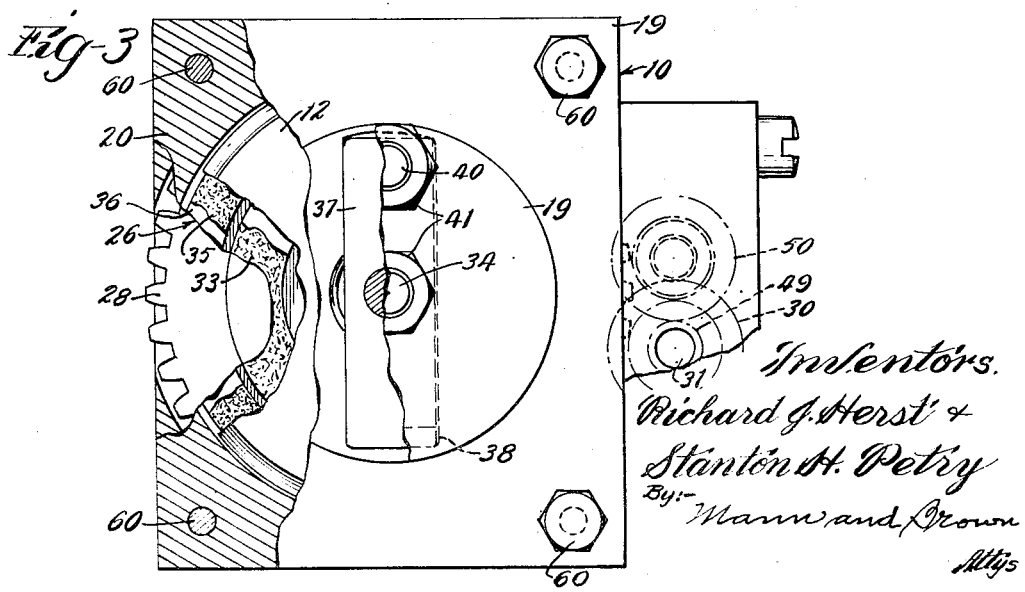
Inventors.
Richard J. Herst &
Stanton H. Petry
By:— Mann and Brown
Attys April 29, 1952 R. J. HERST ET AL 2,594,775
ELECTROMAGNETIC CLUTCH AND BRAKE SERVO MECHANISM
Filed Aug. 30, 1949 3 Sheets-Sheet 2
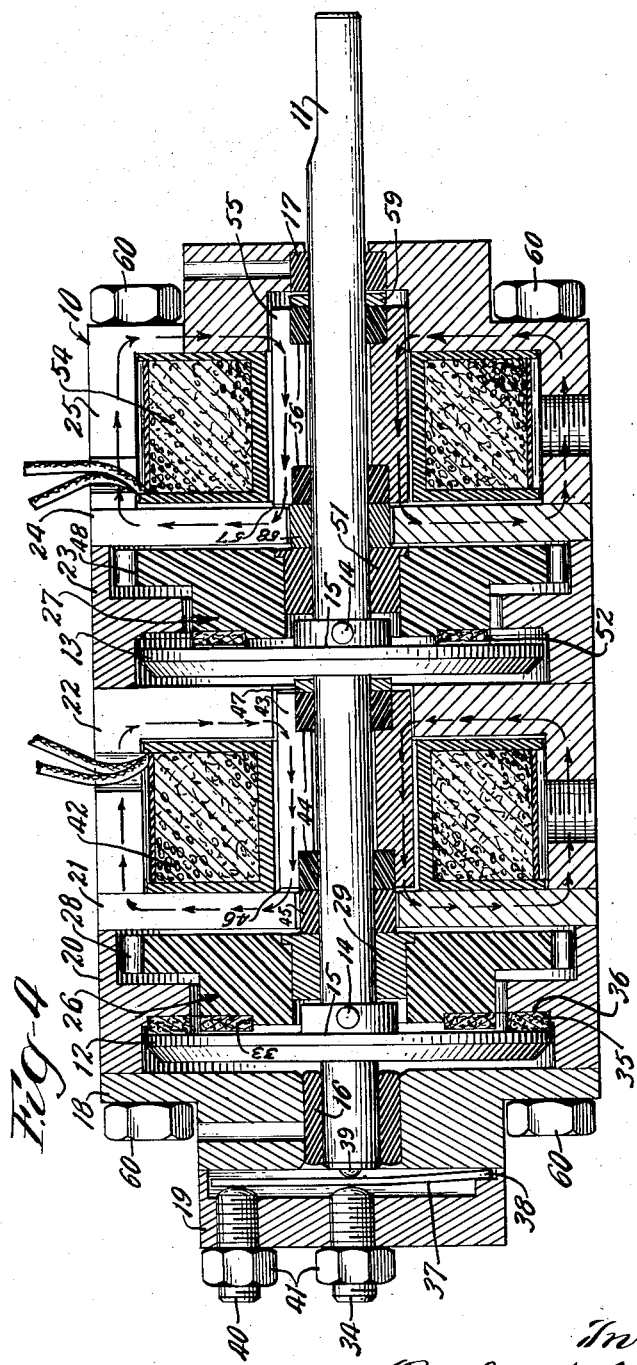
Inventors
Richard J. Herst &
Stanton H. Petry
By:- Mann and Brown
Attys.

April 29, 1952 R. J. HERST ET AL 2,594,775
ELECTROMAGNETIC CLUTCH AND BRAKE SERVO MECHANISM
Filed Aug. 30, 1949
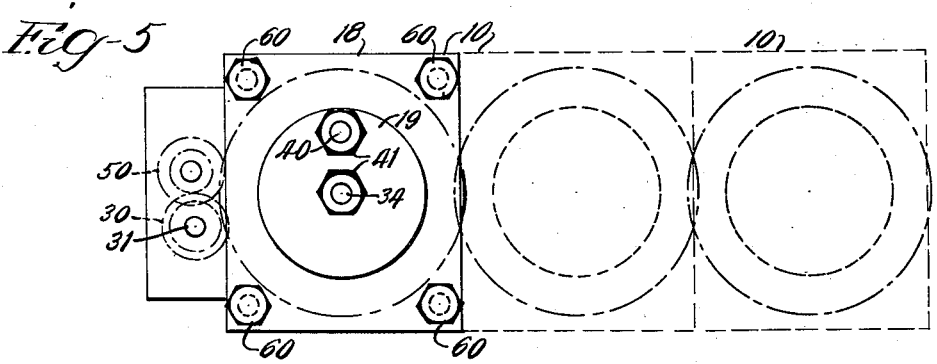
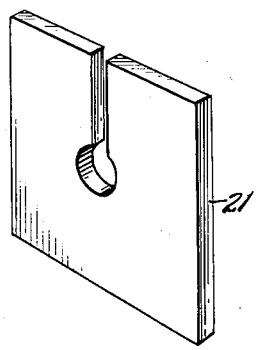
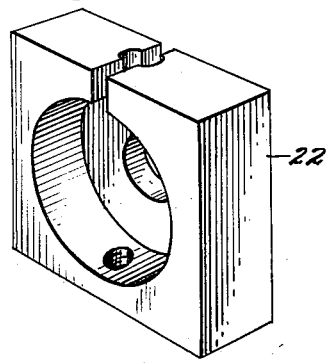
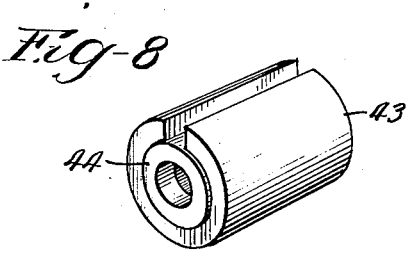
Inventors
Richard J. Herst &
Stanton H. Petry
By:- Mann and Brown
Attys.

Patented Apr. 29, 1952

2,594,775

UNITED STATES PATENT OFFICE 2,594,775

ELECTROMAGNETIC CLUTCH AND BRAKE SERVO MECHANISM

Richard J. Herst, Chicago, and Stanton H. Petry, Evanston, Ill., assignors to Robert O. Buehler, doing business as Buehler and Company Application August 30, 1949, Serial No. 113,181

10 Claims. (Cl. 192—12)

This invention relates to servomechanisms of the clutch-brake type, and the principal objects of the invention are to provide a mechanism of this type which is sturdy, accurate, and reliable; which has little tendency to "hunt" its stabilized position; which has relatively small rotational inertia so that starting is quick and overshooting of balanced position is minimized; which is made up of twin units with a resultant saving in the cost of parts; and which is so constructed and arranged that extremely close tolerances may be established and maintained for the relatively moving parts, and particularly for the air gaps which are associated with the electromagnetic driving clutches.

Further and other objects will become apparent as the disclosure proceeds and the description is read in conjunction with the accompanying drawings, in which Figure 1 is a perspective view showing the external appearance of our servomechanism;

Figure 2 is a side elevational view showing the countershaft drive for the unit;

Figure 3 is an end view but with parts broken away to show the construction and arrangement of internal parts;

Figure 4 is a vertical sectional view through the servomechanism, the output shaft and clutch discs, however, being shown in elevation;

Figure 5 is an end elevational view showing the manner in which a number of servomechanisms may be stacked for multiple operation;

Figure 6 is a perspective view showing the iron plate which forms a closure for the coil housing;

Figure 7 is a perspective view showing the coil housing; and

Figure 8 is a view showing the split core for the electromagnetic clutches.

The showing, in the drawings, of a preferred embodiment of the invention and the specific description thereof which follows are in compliance with Section 4888 of the Revised Statutes and should not be construed as imposing limitations on the appended claims except as may be required by the prior art.

A servomechanism, although having many applications, most frequently serves as a position selector for a rotary shaft; that is, the output shaft of the servomechanism is intended to follow precisely the movement and position of a remote input shaft. This is accomplished in most cases by a bridge circuit which detects movement of one shaft relative to the other, and a reversible electric motor which responds to unbalanced conditions in the bridge circuit to move the output or control shaft of the servomechanism in conformity with movements of the input shaft.

A servomechanism employing an induction motor as the means for controlling position of the output shaft has the inherent disadvantage that the output shaft, in moving to the desired position, is likely to overshoot its mark, causing the shaft to be turned in the opposite direction and again producing forces which tend to cause the shaft to overshoot its mark. The result is that the mechanism is continually hunting its stabilized position and this constant movement of the output shaft not only destroys the accuracy of the servomechanism, but also produces needless wear.

By contrast, a servomechanism of the clutch-brake type, such as shown in the copending application of Francis E. Edwards, Jr., Serial No. 34,700, filed June 23, 1948, has little tendency to oscillate about its balanced position and rarely overshoots its mark because of the action of the brake which is automatically applied when the driving clutches are disengaged. Sometimes when the output shaft is required to make an extensive adjustment due to corresponding movement of the input shaft, the inertia of the shaft with the load that it carries will produce slight overshooting of the mark, but this is rapidly corrected by the action of the reverse clutch, and the shaft soon finds its adjusted position and remains in that position, by the action of the brake, as long as the system is undisturbed.

The present invention represents an improvement in the clutch-brake type of servomechanism disclosed in the Edwards application above identified, and is particularly suited for volume production. A mechanism of this type requires extremely close tolerances for satisfactory operation, and the present invention provides an arrangement whereby these tolerances may be readily obtained and maintained.

Referring now to Fig. 4, it will be seen that the servomechanism, generally designated 10, comprises an output shaft 11, preferably of stainless steel or cold rolled steel, to which spaced discs 12 and 13 are secured by pins 14. The discs are preferably made of non-magnetic stainless steel, and the forward face 15 of each disc (considering the right hand side of the unit as the front end) is ground to complete flatness.

The shaft is supported at its ends by bearings 16 and 17, these bearings preferably being made of Oilite and being self-lubricating, although oil holes may be provided, if desired.

The servomechanism casing comprises a number of sections including a rear housing 18 having a removable end plate 19, a clutch housing 20, an iron plate 21, a cup-shaped coil housing 22 constituting a part of the iron circuit for one of the electromagnetic clutches, a second clutch housing 23, another iron plate 24, and a second cup-shaped housing 25 which closes the front end of the unit.

These parts will be described in more detail in conjunction with the functions which they serve.

The servomechanism comprises essentially two electromagnetic clutches, generally designated 26 and 27, which are adapted to apply a driving force to the shaft 11 in a selected direction. The clutch 26 comprises a gear 28, preferably of laminated linen-base phenolic, and which for convenience will be referred to as the counter-clockwise clutch gear. The gear has pressed into it an Oilite bearing 29 which mounts the gear loosely upon the shaft 11 for rotary movement relative thereto, and the gear is constantly driven by a pinion gear 30 (Fig. 2) mounted on a countershaft 31 connected directly, through a universal coupling 32, to a motor (not shown).

A clutch ring 33 is secured to the rear face of the counter-clockwise clutch gear 28, and the mounting of the gear on the shaft is such that the gear may be moved slightly to the left to bring the clutch ring into driving engagement with the planar face 15 of the clutch disc 12.

The output shaft 11 is also capable of slight longitudinal movement—its movement to the left or rear being limited by an adjustable stop 34 threaded into the cover plate 19, and movement to the right being limited by a brake ring 35 which is mounted on the rear face of an inwardly extending flange 36 of the clutch housing 20.

The clutch ring 33 and the brake ring 35 are both made of high-grade cork, and are firmly secured to the part with which they are associated, i. e., the clutch ring 33 is cemented to the gear 28, and the brake ring 35 is cemented to the clutch housing 20. Obviously the brake ring 35 and/or the clutch ring 33 could be secured to the disc 12, if desired, and this variation should be considered as an equivalent structure.

The shaft 11 is normally biased to the right or braking position by a leaf spring 37 which is anchored at 38 and bears against a ball bearing 39 fitted into the end of the shaft 11. The extent of the bias is determined by the pressure applied to the spring 37 by adjusting screw 40, and this adjustment is critical with respect to the action of the electromagnetic clutches 26 and 27. Lock nuts 41 maintain the adjusting screws 34 and 40 in their desired adjusted position.

Movement of the counter-clockwise clutch gear 28 with its clutch ring 33 into driving engagement with the disc 12 is accomplished by an electromagnet comprising a coil 42 telescoped over the shaft 11 and seated within the cup-shaped housing 22. The iron circuit for the electromagnet includes not only the iron plate 21 and housing 22, but also a movable iron core 43 which has pressed-in phenolic bearings 44 at its outer ends which are telescoped over the shaft 11 and are rotatable and longitudinally slidable with respect thereto. All parts of the iron circuit are slotted to reduce eddy currents, and speed up action of the electromagnetic clutch. This is shown best in Figs. 6, 7 and 8.

The core 43 is held in the desired spaced relation from the gear 28 by a loose-fitting brass spacer 45, and the critical air gap which closes or is reduced in size when the coil 42 is energized is shown at 46. A loose-fitting brass spacer 47 is mounted at the front end of the core 43 to keep the core properly spaced from the adjoining disc 13, although this distance is not critical.

It should be understood that the air gap 46 is critical in the sense that when the associated coil 42 is energized to set up a magnetic force tending to bias the core 43 against the spacer 45 which in turn is then biased against the hub 29 of the gear 28, the air gap 46 is then defined and at this instant must be sufficient in extent to permit further movement of the core 43 to the left to not only bring the gear 28 into engagement with the disc 12, but also displace it with respect to the brake ring 35. In other words, at the instant that the coil 42 is energized, a magnetic force is set up which moves the core 43 to the left and clamps the core 43 and spacer 45 against the gear 28, thus providing the critical air gap required for the actual engagement of the clutch and displacement of the disc 12 away from the brake ring 35. Obviously, when the clutch is disengaged, there is no need for a critical air gap or to maintain the parts in this relationship, except that permissive movement of the core 43 to the right is restricted sufficiently by spacer 47, so that subsequent energization of the coil 42 will always pick up the core 43 and bias the associated parts to the left.

It will be seen that when the coil 42 is energized, the magnetic flux travels through the iron circuit as shown by the arrows, and the core 43 is moved to the left tending to close the air gap 46. This movement of the core is transmitted through the spacer 45 to the clutch gear 28 and clutch ring 33, the latter lifting the disc 12 from the brake ring 35 and transmitting the counterclockwise driving force of the gear 28 to the shaft 11. This movement is on the order of a few thousandths of an inch, possibly .003 of an inch, and from this may be seen the precision character of the device. Upon de-energizing the coil 42, the spring bias on the shaft immediately forces the disc 12 against the brake ring 35, causing the shaft to stop rotation immediately.

In a similar manner, the electromagnetic clutch 27 is adapted to transmit a driving force to the output shaft 11, but in this case, the driving force is in a clockwise direction. The clockwise gear is shown at 48, and it is driven in this direction by a pinion gear 49 which is mounted on the countershaft 31 and drives through a reversing gear 50 which is in mesh with the gear 48.

The gear 48 has a pressed-in Oilite bearing 51 which loosely mounts the gear on the shaft 11 for rotation thereabout, and the rear face of the clutch gear has a clutch ring 52 which is adapted to make contact with the clutch face 15 of the disc 13. Since the clutch discs 13 and 12 are firmly secured to the shaft 11, it is unnecessary to provide a brake disc on the clutch housing 23, although one could be provided for cooperation with the disc 13 if desired.

The clutch gear 48 with its clutch ring 52 is moved into driving engagement with the clutch disc 13 by an electromagnet which includes a coil 54 and an iron circuit similar in all respects to the one associated with the clutch 26. The movable core 55 associated with the coil 54 has pressed-in phenolic bearings 56 and the operating air gap is indicated at 57. The movable core 55 is held in proper spaced relation to the gear 48 by a brass collar or spacer 58, and a similar spacing collar 59 is provided at the other end of the core 55 to prevent the core 55 from moving too far forwardly.

Operation of the clutch 27 is similar to that of the clutch 26 since energization of the coil 54 causes the movable magnet core 55 to move to the left in its attempt to close the air gap 57, this movement being transmitted through spacer 58 to the gear 48 and clutch ring 52, which moves the shaft assembly slightly to the left to thereby lift the clutch disc 12 from the brake ring 35, thereby permitting clockwise clutch gear 48 to transmit corresponding rotation to the shaft 11. The iron circuit for the clutch 27 is slotted in the same manner as clutch 26 to reduce eddy currents and minimize time lag in the operation of the clutch, and the width of air gap 57 corresponds to that of air gap 46, previously described.

The entire assemblage is held together by tie bolts 60, as shown on the drawings.

Since the shaft 11 travels but two or three thousandths of an inch in moving from its braked position to its driving position, it is of utmost importance that all components which fix the spacing of the parts along the shaft be made with precision and properly assembled. The present construction permits such precision to be built into the servomechanism in a manner consistent with mass production techniques.

In assembling the servomechanism, the tie bolts 60 are first fitted with nuts at the rear end, and the rear housing 18 is then mounted on the tie bolts. The shaft 11 with the clutch disc 12 pinned in place, but with clutch disc 13 removed, is then slipped into the bearing 16 and temporarily supported at its front end. The clutch housing 20, which, like the end housing 18, is preferably made of aluminum, is then slipped in place on the tie bolts, the rear or operating face of the brake disc 35 having previously been ground to proper distance from the front face of the clutch housing 20. The gear 28 is then slipped in place, and in order for the face of the clutch ring 33 to be properly spaced with respect to the front face of the Oilite bearing 29, the clutch ring is ground to provide the desired dimension between these two faces.

The soft iron plate 21 is then put into place, and since the thickness of this plate is very critical with respect to the operating air gap 46, it is surface ground to close tolerance. The brass spacer 45 and the magnet core 43 are then slipped into place over the shaft 11 and both ends of the spacer are preferably ground so that the rear end of the magnet core 43 is properly spaced from the plate 21 to provide the desired air gap 46.

After slipping the washer 47 in place, the cup-shaped iron circuit 22 is then mounted on the tie bolts and then the disc 13 is slipped on the shaft and secured thereto by the pin 14. Matched sets of discs and shafts are used so that when the disc 13 is pinned to the shaft, it is spaced from the rear disc 12 the desired distance.

The remaining assembly operations are more or less obvious, with the aluminum clutch housing 23 being then slipped into place, thereafter the clockwise clutch gear 48, iron plate 24, spacer 58, magnet core 55, washer 59, and then finally the iron coil housing 25, after which nuts are applied to the front ends of the tie bolts and the entire assembly firmly clamped together.

One advantage of the present construction is that any number of units may be stacked, as shown in Fig. 5, for multiple operation, with the clutch gears of adjacent units extending slightly beyond the external face of the casing and intermeshing for carrying the gear drives from one unit to another, and with only one of the units being driven through a countershaft from an external source of rotary power. Preferably the pitch line of the clutch gears is tangential to the external face of the casing.

We claim:

1. In a servomechanism of the clutch-brake type, a shaft having spaced discs mounted thereon, a casing over the shaft providing bearings for its support, a brake ring on the casing engageable with one of said discs when the shaft is moved longitudinally along its axis in one direction, spring means biasing the shaft in said direction, forward and reverse clutch mechanisms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, and an electromagnet for effecting said clutch engaging movement, said electromagnet comprising a coil telescoped over the shaft, a movable core within the coil and also telescoped over the shaft, and an iron circuit closed except for an operating air gap.

2. In a servomechanism of the clutch-brake type, a shaft having spaced discs mounted thereon, a casing over the shaft providing bearings for its support, a brake ring on the casing engageable with one of said discs when the shaft is moved longitudinally along its axis in one direction, spring means biasing the shaft in said direction, forward and reverse clutch mechanisms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, and an electromagnet for effecting said clutch engaging movement, said electromagnet comprising a coil telescoped over the shaft, a movable core within the coil and also telescoped over the shaft, and an iron circuit closed except for an operating air gap and including the core and at least a portion of said casing.

3. In a servomechanism of the clutch-brake type, a shaft having spaced discs mounted thereon, a casing over the shaft providing bearings for its support, a brake ring on the casing engageable with one of said discs when the shaft is moved longitudinally along its axis in one direction, spring means biasing the shaft in said direction, forward and reverse clutch mechanisms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, an electromagnet for effecting said clutch engaging movement, said electromagnet comprising a coil telescoped over the shaft, a movable core within the coil and also telescoped over the shaft, and an iron circuit closed except for an operating air gap, and including a cup-shaped member in which the coil is seated, and a plate substantially closing said member except for an axial opening, and a spacer within said opening and between the core and the gear for fixing the position of the core with respect to said plate to thereby establish the operating air gap.

4. In a servomechanism of the clutch-brake type, a shaft having spaced discs mounted thereon, a casing over the shaft providing bearings for its support, a brake ring on the casing engageable with one of said discs when the shaft is moved longitudinally along its axis in one direction, spring means biasing the shaft in said direction, forward and reverse clutch mechanisms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, and an electromagnet for effecting said clutch-engaging movement, said electromagnet comprising a coil telescoped over the shaft, a movable core within the coil and also telescoped over the shaft, and an iron circuit closed except for an operating air gap, said casing being made in a plurality of interfitting face ground sections whereby the exact positioning of elements of said mechanism along the shaft is facilitated.

5. In a servomechanism of the clutch-brake type, a shaft having spaced discs mounted thereon, a casing over the shaft providing bearings for its support, a brake ring on the casing engageable with one of said discs when the shaft is moved longitudinally along its axis in one direction, spring means biasing the shaft in said direction, forward and reverse clutch mechanisms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, an electromagnet for effecting said clutch-engaging movement, said electromagnet comprising a coil telescoped over the shaft, a movable core within the coil and also telescoped over the shaft, and an iron circuit closed except for an operating air gap, the spring means for biasing the shaft comprising a leaf spring extending across the end of the shaft, and means for adjusting the tension of said spring.

6. In a servomechanism of the clutch-brake type, a shaft having spaced discs mounted thereon, a casing over the shaft providing bearings for its support, a brake ring on the casing engageable with one of said discs when the shaft is moved longitudinally along its axis in one direction, spring means biasing the shaft in said direction, forward and reverse clutch mechanisms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, an electromagnet for effecting said clutch-engaging movement, said electromagnet comprising a coil telescoped over the shaft, a movable core within the coil and also telescoped over the shaft, and an iron circuit closed except for an operating air gap, and means for limiting movement of the shaft in an axial direction opposite to that of the spring bias.

7. In a servomechanism of the clutch-brake type, a shaft having spaced discs mounted thereon, a casing over the shaft providing bearings for its support, a brake ring on the casing engageable with one of said discs when the shaft is moved longitudinally along its axis in one direction, spring means biasing the shaft in said direction, forward and reverse clutch mechanisms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, an electromagnet for effecting said clutch-engaging movement, said electromagnet comprising a coil telescoped over the shaft, a movable core within the coil and also telescoped over the shaft, and an iron circuit closed except for an operating air gap, and adjustable means for limiting movement of the shaft in an axial direction opposite to that of the spring bias.

8. In a servomechanism of the clutch-brake type, a shaft having spaced discs mounted thereon, a casing over the shaft providing bearings for its support, a brake ring on the casing engageable with one of said discs when the shaft is moved longitudinally along its axis in one direction, spring means biasing the shaft in said drection, forward and reverse clutch mechanisms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, and an electromagnet for effecting said clutch engaging movement, said electromagnet comprising a coil telescoped over the shaft, a movable core within the coil and also telescoped over the shaft, and an iron circuit closed except for an operating air gap, said discs on the shaft forming no part of said iron circuit.

9. In a servomechanism of the clutch-brake type, a shaft having spaced discs mounted thereon, a substantially rectangular casing over the shaft providing bearings for its support, a brake ring on the casing engageable with one of said discs when the shaft is moved longitudinally along its axis in one direction, spring means biasing the shaft in said direction, forward and reverse clutch mechanisms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, an electromagnet for effecting said clutch-engaging movement, said electromagnet comprising a coil telescoped over the shaft, a movable core within the coil and also telescoped over the shaft, and an iron circuit closed except for an operating air gap, said gears having their pitch line substantially tangential to the external face of the casing, whereby a number of units may be stacked together with gears intermeshed for transfer of power from one unit to the adjacent unit.

10. In a servomechanism of the clutch-brake type, a shaft having spaced discs mounted thereon, a casing over the shaft providing bearings for its support, a brake ring on the casing engageable with one of said discs when the shaft is moved longitudinally along its axis in one direction, spring means biasing the shaft in said direction, forward and reverse clutch mechansms for rotating the shaft in a selected direction, one such mechanism being associated with each disc, said clutch mechanisms each comprising a gear rotatably mounted on the shaft, a friction clutch ring on the gear engageable with the juxtaposed disc when the gear is moved in a direction opposite to that of the shaft bias, and an electromagnet for effecting said clutch engaging movement, said electromagnet comprising a coil telescoped over the shaft, a movable core within the coil and also telescoped over the shaft, and an iron circuit closed except for an operating air gap, at least a portion of said iron circuit being slotted to minimize eddy currents.

RICHARD J. HERST.
STANTON H. PETRY.

REFERENCES CITED

The following references are of record in the file of this patent:

UNITED STATES PATENTS

| Number | Name | Date |
|---|---|---|
| 744,423 | Steckel | Nov. 17, 1903 |
| 2,464,129 | Goettisheim | Mar. 8, 1949 |
| 2,490,044 | Gabarini et al. | Dec. 6, 1949 |